United States Patent
Kerhuel

(10) Patent No.: US 9,325,451 B1
(45) Date of Patent: Apr. 26, 2016

(54) MAXIMUM LIKELIHOOD DECODING APPARATUS

(71) Applicant: Samuel Kerhuel, Villeneuve Tolosane (FR)

(72) Inventor: Samuel Kerhuel, Villeneuve Tolosane (FR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/691,620

(22) Filed: Apr. 21, 2015

(30) Foreign Application Priority Data

Nov. 21, 2014 (WO) .................. PCT/IB2014/002916

(51) Int. Cl.
*H04L 27/06* (2006.01)
*H04L 1/00* (2006.01)
*H04B 17/309* (2015.01)
*H04W 24/04* (2009.01)

(52) U.S. Cl.
CPC ............ *H04L 1/0054* (2013.01); *H04B 17/309* (2015.01); *H04W 24/04* (2013.01)

(58) Field of Classification Search
CPC .................................................. H04B 1/70735
USPC ........................................................ 375/341
See application file for complete search history.

(56) References Cited

PUBLICATIONS

Tao Cui; Tellambura, C., "Semiblind Channel Estimation and Data Detection for OFDM Systems With Optimal Pilot Design," Communications, IEEE Transactions on , vol. 55, No. 5, pp. 1053,1062, May 2007.
Aktas, E.; Mitra, U., "Semiblind channel estimation for CDMA systems with parallel data and pilot signals," Communications, IEEE Transactions on , vol. 52, No. 7, pp. 1102,1112, Jul. 2004 doi: 10.1109/TCOMM.2004.831344.
Yang Hu; Astely, D.; Baldemair, R.; Falahati, S., "Semi-Blind Multi-User Detection for LTE PUCCH," Wireless Communications and Networking Conference, 2009. WCNC 2009. IEEE , vol., no., pp. 1,5, Apr. 5-8, 2009.
Milos, J.; Hanus, S., "Simulation of UCI transmission via PUCCH in LTE uplink," Radioelektronika (RADIOELEKTRONIKA), 2014 24th International Conference , vol., no., pp. 1,4, Apr. 15-16, 2014 doi: 10.1109/Radioelek.2014.6828430.

*Primary Examiner* — Lihong Yu

(57) ABSTRACT

A decoding apparatus for decoding a signal transmitted over a channel in a communication system, the signal comprising at least one data symbol and one pilot symbol the data symbol comprising a first encoded sequence encoding a transmitted sequence, the pilot symbol comprising a pilot signal.
The decoding apparatus performs an additional processing after the operations of a conventional maximum likelihood decoding. A predetermined number of hypotheses of the conventional maximum likelihood decoding are selected to perform a maximum likelihood processing where channel estimation is improved by considering data symbol information. A receiver, a LTE receiver, a method and a computer program are also claimed.

17 Claims, 4 Drawing Sheets

MAXIMUM LIKELIHOOD DECODING APPARATUS

CROSS REFERENCE TO RELATED APPLICATION(S)

The present application claims priority to International Patent Application No. PCT/IB2014/002916, entitled "MAXIMUM LIKELIHOOD DECODING APPARATUS," filed on Nov. 21, 2014, the entirety of which is herein incorporated by reference.

FIELD OF THE INVENTION

This invention relates to a decoding apparatus, a receiver, a method and a computer program for decoding a signal transmitted over a communication channel.

BACKGROUND OF THE INVENTION

Today's wireless networks, such as HSPA (High Speed Packet Access) and LTE (Long Term Evolution), have high transmission capabilities and are robust to multipath delay that usually occurs in frequency selective fading channels. However, such performance can only be achieved where accurate channel information is available, which is seldom easily obtainable. In coherent decoding, known pilot symbols are often employed, such as in LTE for instance, where known subcarriers are inserted in the time-frequency grid. In certain communication channels the pilot density such that accurate channel estimation can be obtained. However, in other communication channels, the pilot density is so low that accurate channel estimation cannot be easily obtained. This problem can be alleviated by increasing the pilot symbol density, i.e. increasing the number of pilot symbols with respect to the number of data symbols. However, such solution may reduce the resource for the data transmission in time and/or frequency domain, thus decreasing the overall throughput.

Recently, there have been efforts to perform channel estimation by using the known pilot symbols along with unknown data symbols. Such methods, known as semi-blind, exploit the statistics of the unknown data symbols as well as the known pilot symbols in order to provide better performance than pilot based method using the same number of pilot symbols or, alternatively, requiring a smaller number of pilot symbols to achieve the same performance. Document (1) "Semi-Blind Multi-User Detection for LTE PUCCH" (Yang Hu; Astely, D.; Baldemair, R.; Falahati, S., Wireless Communications and Networking Conference, 2009. WCNC 2009. IEEE, pp. 1,5, 5-8 Apr. 2009) makes use of such method in a LTE uplink decoder, by calculating an exact maximum likelihood (ML) estimate value of the channel. However, in the foregoing LTE uplink decoder, complexity is exponential in the number of source data symbols which makes it impracticable for input information having large number of bits.

Therefore, it would be desirable to have an improved decoder that would be able to improve channel estimation accuracy without requiring high computational complexity.

SUMMARY OF THE INVENTION

The present invention provides a decoding apparatus, a receiver, a LTE receiver, a method and a computer program for decoding a signal transmitted over a communication channel, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for a proper understanding of the subject application, the following detailed description will focus on the decoding of a LTE Physical Uplink Control Channel (PUCCH) signal in its formats 2/2a/2b.i However, persons skilled in the art of communication systems will readily appreciate that the proposed solution may also apply to LTE PUCCH signal in its format 2/2a/2b but also in other communication systems different from LTE and other channels different from the LTE PUCCH, in both uplink and downlink, where those others communication systems and others channels exhibit the same characteristics as those described thereinafter.

First, for the sake of clarity, it will be described how a LTE PUCCH signal in its format 2, is encoded. A UE uses PUCCH format 2 control information to relay an estimate of the channel properties to the base station in order to aid channel dependent scheduling. Channel status reports include CQI (Channel Quality Indicator), PMI (Precoding Matrix Indicator) information and RI (Rank indicator) information.

Figure 1:
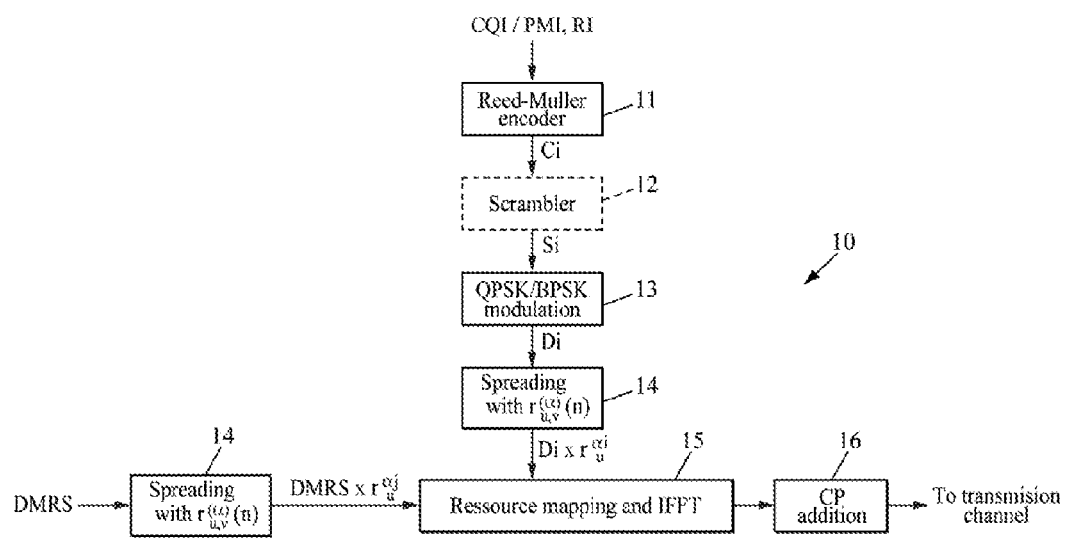
FIG. 1 is a schematic diagram of a LTE PUCCH transmitter.

CQI information represents the recommended modulation scheme and coding rate that should be used for the downlink transmission. RI information provides information about the rank of the channel, which is used to determine the optimal number of layers that should be used for the downlink transmission (only used for spatial multiplexed systems). PMI information provides information about which precoding matrix to use (only used in closed loop spatial multiplexing systems). HARQ-ACK (Hybrid Automatic Repeat request acknowledgements) information can also be transmitted with channel status information. Two forms of channel coding exist comprising one for the CQI information alone and another for the combination of CQI information with HARQ-ACK information. Thereinafter, reference will be made to FIG. 1 wherein it is shown the process of encoding CQI information associated with a single UE. However, it should be noted that others information such as the PMI information or information may also be included in the LTE PUCCH signal. Further, encoding a plurality of UEs is performed in the same way after that UE's information has been multiplexed. Referring to FIG. 1, there is diagrammatically shown therein a PUCCH transmitter 10. The LTE PUCCH transmitter 10 comprises:

- an encoding unit 11 such as a maximum likelihood encoder, arranged to encode sequences, such as CQI information, into encoded sequences ($C_i$). In the following description, it will be considered that the encoding unit 11 is a Reed-Muller encoder arranged to encode sequences, such as CQI information, into Reed-Muller encoded sequences ($C_i$). However, other types of maximum likelihood encoders are also contemplated by the subject application;
- a scrambling unit 12 such as those which are normally encountered in communication systems, arranged to scramble Reed-Muller encoded sequences ($C_i$) into scrambled sequences ($S_i$);
- a modulation unit 13 such as a QPSK/BPSK (Quadrature Phase Shift Keying/Binary Phase Shift Keying) modulator, arranged to modulate scrambled sequences ($S_i$) into modulated sequence ($D_i$);
- a code-spreading unit 14 such as a Constant Amplitude Zero Autocorrelation (CAZAC) spreading unit, arranged to spread a modulated sequence ($D_i$) into the frequency domain, thereby generating a frequency-spreaded sequence;
- a resource mapping and Inverse Fast-Fourier Transform (IFFT) unit 15 such as an IFFT transformer, arranged to generate a time-domain signal based on the frequency-spreaded sequence; and,
- a Cyclic Prefix (CP) addition unit 16 such as a signal processing unit, arranged to add a CP to a time-domain signal.

The encoding unit 11 is operably coupled to the scrambling unit 12, the latter being operably coupled to the modulation unit 13. The modulation unit 13 is further operably coupled to the code-spreading unit 14, the latter being operably coupled the resource mapping and IFFT unit 15. Finally, the resource mapping and IFFT unit 15 is further operably coupled to the CP addition unit 16. The LTE PUCCH transmitter 10 may further comprise one or more transmitting antennas such as those which are normally encountered in communication systems. In an embodiment, there is no scrambling unit 12 and the encoding unit 11 is operably coupled to the modulation unit 13.

Figure 2:
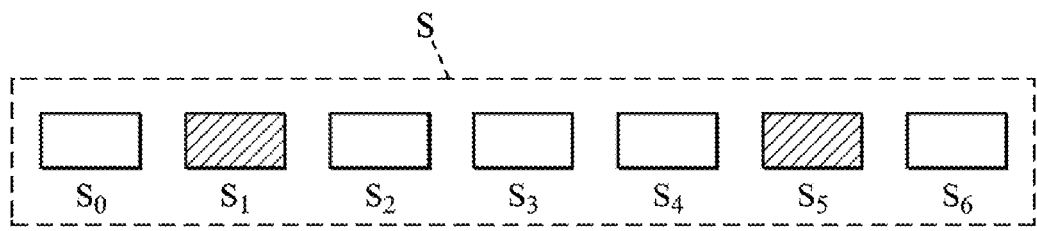
FIG. 2 is a schematic diagram of an exemplary time-domain signal transmitted by the LTE PUCCH transmitter of FIG. 1.

In the LTE PUCCH transmitter 10 of FIG. 1, an UE encodes its CQI information using the encoding unit 11, thereby generating a Reed-Muller encoded sequence ($C_i$). For instance, such encoding may be performed according to a (20, A) Reed-Muller code where A corresponds to the length of input codeword in bits. In an embodiment (not shown) the Reed-Muller encoded sequence ($C_i$) may be further multiplexed with one or two-bit HARQ-ACK information. Later, the scrambling unit 12 scrambles the Reed-Muller encoded sequence ($C_i$) into a scrambled sequence ($S_i$) for the purpose of ensuring interference randomisation between cells. Further, the modulation unit 13 modulates the scrambled sequence ($S_i$) into a modulated sequence ($D_i$). For instance, in LTE PUCCH signal in its format 2, QPSK is used while BPSK is further used in its format 2a in order to modulate one bit HARQ-ACK information and QPSK is further used in its format 2b in order to modulate two bit HARQ-ACK information. Later, for a particular UE, the code-spreading unit 14 spreads the modulated sequence ($D_i$) in the frequency domain across a plurality of subcarriers allocated to the LTE PUCCH signal, thereby generating a data frequency-spreaded sequence ($D_i \times r_u^{a_i}$). For instance, for the LTE PUCCH signal, this is performed by multiplying the modulated sequence ($D_i$) by a cyclic shift sequence ($r_u^{a_i}$) designed from a frequency-domain base sequence associated with a given cell. In LTE, the frequency-domain base sequence is a Zadoff-Chu (ZC) sequence which is used for minimising cross-correlation between different UE signals in the same cell. In fact, a ZC sequence exhibits constant amplitude zero autocorrelation (CAZAC) property in the frequency domain. Further, the code-spreading unit 14 spreads a pilot signal such as a demodulation reference signal (DMRS) in the frequency domain across a plurality of subcarriers allocated to the LTE PUCCH signal, thereby generating a pilot frequency-spreaded sequence (DMRS$\times r_u^{a_i}$). For instance, for the LTE PUCCH signal, this is performed by multiplying the pilot signal (DMRS) by a cyclic shift sequence ($r_u^{a_i}$) designed from the frequency-domain base sequence as already explained above. The pilot signal (DMRS) will be used for the purpose of channel estimation. Later, the resource mapping and IFFT unit 15 generates a time-domain signal based on the data frequency-spreaded sequence ($D_i \times r_u^{a_i}$) and the pilot frequency-spreaded sequence (DMRS$\times r_u^{a_i}$). Still further, the CP addition unit 16 adds a cyclic prefix to the time-domain signal, thereby creating a LTE PUCCH signal. In the example of FIG. 1 and in the description thereinafter, the LTE PUCCH signal is arranged so as to comprise at least one data symbol and one pilot symbol. Of course, the LTE PUCCH signal may comprise one or more pilot symbols and data symbols. For instance, in FIG. 2, there is shown therein such an exemplary LTE PUCCH signal S which comprises a plurality of symbols $s_0, s_1, s_2, s_3, s_4, s_5, s_6$. The LTE PUCCH signal S of FIG. 2 comprises five data symbols $s_0, s_2, s_3, s_4, s_6$ and two pilot symbols $s_1, s_5$. For the sake of clarity, it is reminded that in the following description only one data symbol and one pilot symbol would be considered in the sake of comprehension. However, the teaching of the subject application can readily be applied to a time-domain signal such as the LTE PUCCH signal S of FIG. 2. Referring back to FIG. 1, the LTE PUCCH signal is finally caused to enter the transmission channel such a wireless transmission channel, via the one or more transmitting antennas, for instance.

Figure 3:
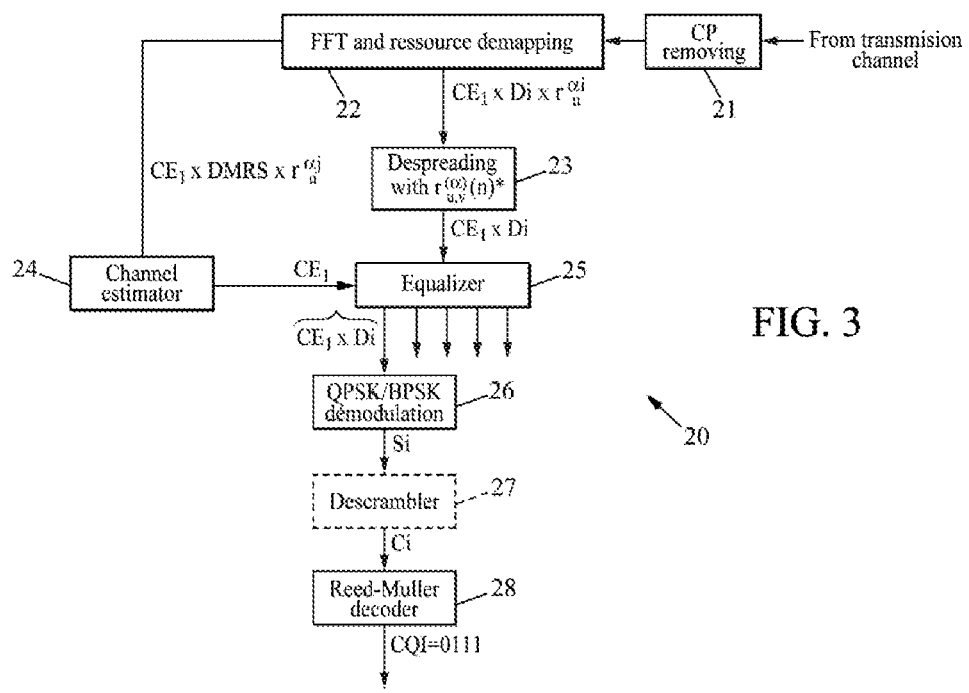
FIG. 3 is a schematic diagram of a conventional LTE PUCCH decoder.

Referring now to FIG. 3, there is diagrammatically shown therein a conventional LTE PUCCH receiver 20 able to decode the LTE PUCCH signal transmitted by the LTE PUCCH transmitter 10 of FIG. 1. However, the conventional LTE PUCCH receiver 20 is also able to decode the LTE PUCCH signal of FIG. 2. The conventional LTE PUCCH receiver 20 comprises:

- a CP removing unit 21 such as a signal processing unit, arranged to remove a CP from a time-domain signal such as a LTE PUCCH signal;
- a Fast-Fourier Transform (FFT) and resource demapping unit 22 such as a FFT transformer, arranged to generate:
- a received data frequency-domain signal ($CE_1 \times D_i \times r_u^{a_i}$) based on a data symbol comprised in a time-domain signal such as a LTE PUCCH signal; and,
- a received pilot frequency-domain signal ($CE_1 \times$DMRS$\times r_u^{a_i}$) based on a pilot symbol comprised in a time-domain signal such as a LTE PUCCH signal;
- a code-despreading unit 23 such as a CAZAC despreading unit, arranged to despread a received data frequency-domain signal ($CE_1 \times D_i \times r_u^{a_i}$) from the frequency domain, thereby generating a data frequency-despreaded signal ($CE_1 \times d_i$);

a channel estimation unit 24 such as a time-frequency interpolator, arranged to calculate a channel estimation value ($CE_1$) of a transmission channel, such as a wireless channel, based on a received pilot frequency-domain signal ($CE_1 \times DMRS \times r_u^{a_i}$);

an equalizing unit 25 such as those which are normally encountered in communication systems, arranged to generate a data frequency-despreaded signal ($CE_1 \times D_i$) thereby generating an equalized data frequency-despreaded signal ($\widetilde{CE_1 \times D_i}$);

a demodulation unit 26 such as a QPSK/BPSK demodulator, arranged to demodulate an equalized data frequency-despreaded signal ($\widetilde{CE_1 \times D_i}$) into a scrambled sequence ($S_i$) based on a channel estimation value ($CE_1$);

a descrambling unit 27 such as those which are normally encountered in communication systems, arranged to descramble scrambled sequences ($S_i$) into Reed-Muller encoded sequence ($C_i$); and, a decoding unit 28 such as a maximum likelihood decoder, arranged to decode an encoded sequence ($C_i$) and to select the most likely transmitted sequence such as CQI information. In the following description, it will be considered that the decoding unit 28 is a Reed-Muller decoder arranged to decode a Reed-Muller sequence ($C_i$) and to select the most likely transmitted sequence such as CQI information, However, other types of maximum likelihood decoders are also contemplated by the subject application.

The CP removing unit 21 is operably coupled to the FFT and resource demapping unit 22, the latter being operably coupled to the code-despreading unit 23 and to the channel estimation unit 24. The code-despreading unit 23 is further operably coupled to the equalizing unit 25, the latter being operably coupled to the channel estimation unit 24 and to the demodulation unit 26. The demodulation unit 26 is further operably coupled to the descrambling unit 27, the latter being operably coupled to the decoding unit 28. In an embodiment, there is no descrambling unit 27 and the modulation unit 26 is operably coupled to the decoding unit 28.

In the conventional LTE PUCCH receiver 20 of FIG. 3, after a time-domain signal such as a LTE PUCCH signal, has passed through the transmission channel, the CP removing unit 21 removes the cyclic prefix from the received time-domain signal. Later, the FFT and resource demapping unit 22 generates a received data frequency-domain signal ($CE_1 \times D_i \times r_u^{a_i}$) based on the data symbol comprised in the received time-domain signal and also generates a received pilot frequency-domain signal ($CE_1 \times DMRS \times r_u^{a_i}$) based on the pilot symbol comprised in a received time-domain signal. Each of the received data frequency-domain signal ($CE_1 \times D_i \times r_u^{a_i}$) and the received pilot frequency-domain signal ($CE_1 \times DMRS \times r_u^{a_i}$) generated by the FFT and resource demapping unit 22 comprises a channel estimates component ($CE_1$) in comparison with the data frequency-domain signal ($D_i \times r_u^{a_i}$) and the pilot frequency-domain signal ($DMRS \times r_u^{a_i}$) generated by the resource mapping and IFFT unit 15. This is due to the fact that the time-domain signal has passed through the transmission channel. Therefore, $CE_1$ characterise the properties of the transmission channel. Further, the code-despreading unit 23 despreads the received data frequency-domain signal ($CE_1 \times D_i \times r_u^{a_i}$) from the frequency domain, thereby generating a data frequency-despreaded signal ($CE_1 \times D_i$). For instance, for the LTE PUCCH signal, this can be performed by multiplying the received data frequency-domain signal ($CE_1 \times D_i \times r_u^{a_i}$) by the complex conjugate of the corresponding ZC sequence ($r_u^{a_i*}$). Namely, this gives the following relation $CE_1 \times D_i \times r_u^{a_i} \times r_u^{a_i*} = CE_1 \times D_i$. In an embodiment where the time-domain signal comprises more than one data symbol, a data frequency-despreaded signal ($CE_1 \times D_i$) is generated for each data symbol, respectively. Later, referring back to FIG. 3, the channel estimation unit 24 calculates a first channel estimation value ($CE_1$) of the transmission channel over which the time-domain signal was transmitted, based on the received pilot frequency-domain signal ($CE_1 \times DMRS \times r_u^{a_i}$). Further, the equalizing unit 25 equalizes the data frequency-despreaded signal ($CE_1 \times D_i$) based on the first channel estimation value ($CE_1$), thereby generating an equalized data frequency-despreaded signal ($\widetilde{CE_1 \times D_i}$). Still further, the demodulation unit 26 demodulates the equalized data frequency-despreaded signal ($\widetilde{CE_1 \times D_i}$) into a scrambled sequence ($S_i$). This can be done, in a first step, by obtaining the modulated sequence ($D_i$) by multiplying the equalized data frequency-despreaded signal ($\widetilde{CE_1 \times D_i}$) by the complex conjugate of the first channel estimation value ($CE_1^*$) generated by the channel estimator 24. In an embodiment of the first step, the demodulation unit 26 is operably coupled to the channel estimation unit 24 in order to obtain the first channel estimation value ($CE_1$). In a second embodiment of the first step, the first channel estimation value ($CE_1$) is obtained via the equalizing unit 25 along with the equalized data frequency-despreaded signal ($\widetilde{CE_1 \times D_i}$) In a second step, it is obtained the scrambled sequence ($S_i$) by demodulating the obtained modulated sequence ($D_i$). Referring back to FIG. 3, the descrambling unit 27 descrambles the scrambled sequence ($S_i$) into a Reed-Muller encoded sequence ($C_i$). Finally, the decoding unit 28 decodes the Reed-Muller encoded sequence ($C_i$) into a plurality of possible transmitted sequences such as CQI information. As it is known by a person of ordinary skills in the art of communication systems, a maximum likelihood decoder such as a Reed-Muller decoder has to calculate all possible transmitted sequences, also known as hypotheses, which may correspond to the sequence that was actually transmitted, based on the Reed-Muller encoded sequence ($C_i$). Thereinafter, it will alternatively be made reference to the predetermined number of hypotheses or the predetermined numbers of possible transmitted sequences, as both are synonymous. Further, it is known that the number of possible transmitted sequences grows exponentially with the length of the Reed-Muller encoded sequence ($C_i$). In fact, the number of possible transmitted sequences for a L bit actually transmitted sequence is $2^L$. For example, in LTE PUCCH, for 11 bits Reed-Muller encoded sequence ($C_i$), a total of 2048 possible transmitted sequences need to be calculated. Referring back to FIG. 3, the decoding unit 28 selects the most likely transmitted sequence out of the plurality of possible transmitted sequences. The selection of the most likely transmitted sequence out of the hypotheses is made based on a conditional probability, thereinafter known as a the first likelihood metric, which is calculated by the decoding unit 28 for each of the plurality of possible transmitted sequences, based on, at least, the first channel estimation value ($CE_1$). Finally, the decoding unit 28 selects the most likely transmitted sequence (i.e. the best estimated hypothesis) which is the one having the highest probability. In the example of FIG. 3, the most likely transmitted sequence is 0111.

As can be readily understood by a person of ordinary skills in the field of communication systems, the conventional LTE PUCCH receiver 20 is performing pilot-based channel estimation, also known as training-based channel estimation. In fact, in this particular scheme a pilot signal (DMRS) known by the receiver is transmitted to allow channel estimation by the receiver. However, it has been shown in Document (1) that pilot information density with respect to the data information is mainly responsible for channel estimation accuracy. For instance in a LTE slot, for a LTE PUCCH signal in its format 2, there is a pilot information density of 28.6%, since the LTE PUCCH signal comprises two pilot symbols for five data symbols. The situation is even worse in a LTE PUCCH signal in its format 2a/2b since the LTE PUCCH signal, in this case, only comprises one pilot symbol for six data symbols within a LTE slot. Hence, the less the pilot information with respect to the data information, the less accurate is the channel estimation.

Figure 4:
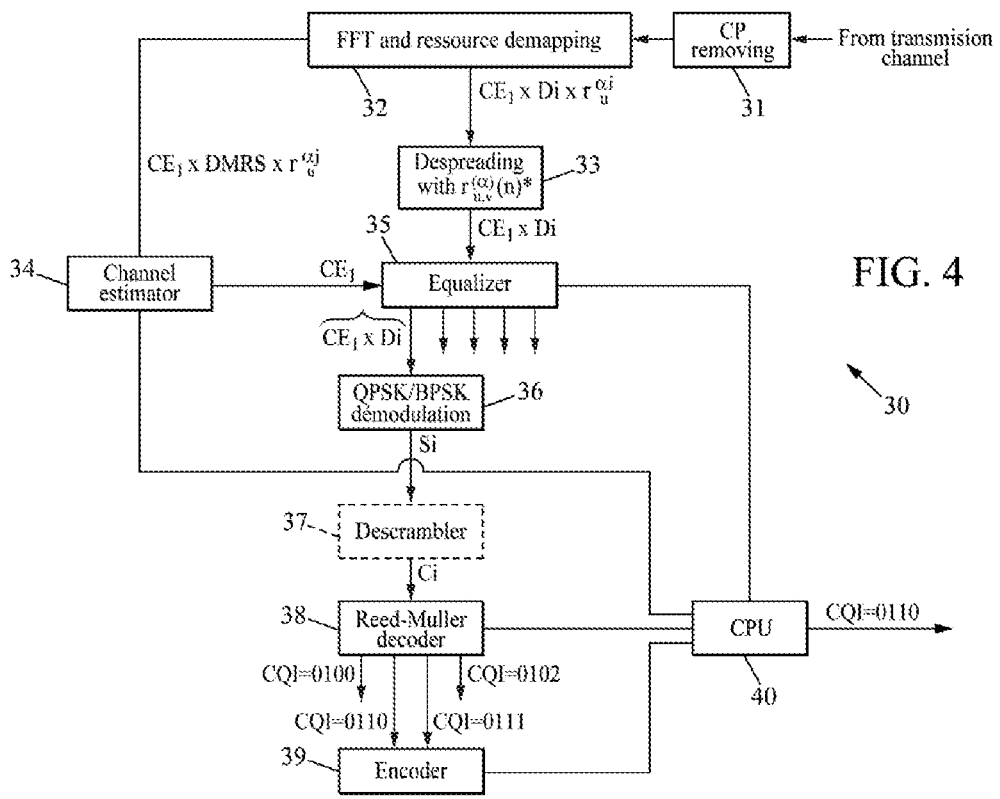
FIG. 4 is a schematic diagram of a decoding apparatus according to embodiments of the subject application.

Referring now to FIG. 4, there is diagrammatically shown therein a decoding apparatus 30 in accordance with embodiments of the subject application. The decoding apparatus 30 is adapted to decode a signal transmitted over a channel in a communication system, such as the time-domain signal generated by the LTE PUCCH transmitter 10. The decoding apparatus 30 comprises:

- a CP removing unit 31 similar to the CP removing unit 21 of the conventional LTE PUCCH receiver 20;
- a FFT and resource demapping unit 32 similar to the FFT and resource demapping unit 22 of the conventional LTE PUCCH receiver 20;
- a code-despreading unit 33 similar to the code-despreading unit 23 of the conventional LTE PUCCH receiver 20;
- a channel estimation unit 34 similar to the channel estimation unit 24 of the conventional LTE PUCCH receiver 20;
- an equalizing unit 35 similar to the equalizing unit unit 25 of the conventional LTE PUCCH receiver 20;
- a demodulation unit 36 similar to the demodulation unit 26 of the conventional LTE PUCCH receiver 20;
- a descrambling unit 37 similar to the descrambling unit 27 of the conventional LTE PUCCH receiver 20;
- a decoding unit 38 similar to the decoding unit 28 of the conventional LTE PUCCH receiver 20;
- an encoding unit 39 similar the combination of the encoding unit 11 and the modulation unit 13. In an embodiment the encoding unit 39 similar the combination of the encoding unit 11, the scrambling unit 12 and the modulation unit 13; and,
- a processing unit 40 such as a processor.

The CP removing unit 31 is operably coupled to the FFT and resource demapping unit 32, the latter being operably coupled to the code-despreading unit 33 and to the channel estimation unit 34. The code-despreading unit 33 is further operably coupled to the equalizing unit 35, the latter being operably coupled to the channel estimation unit 34 and to the demodulation unit 36. The demodulation unit 36 is further operably coupled to the descrambling unit 37, the latter being operably coupled to the decoding unit 38. The decoding unit 38 is further operably coupled to the encoding unit 39, the latter being further coupled to the processing unit 40. The processing unit 40 is further operably coupled to the channel estimation unit 34, the equalizing unit 35 and to the decoding unit 38. In an embodiment, there is no descrambling unit 37 and the modulation unit 36 is operably coupled to the decoding unit 38.

As can be clearly seen while comparing the conventional LTE PUCCH receiver 20 of FIG. 3 with the decoding apparatus 30 of FIG. 4, it can readily be noticed that the encoding unit 39 and the processing unit 40 have been added to the PUCCH receiver 20. Another difference is the fact that the decoding unit 38 selects a predetermined number of possible transmitted sequences, also known as hypotheses, such as a plurality of CQI information, while the decoding unit 28 of FIG. 3 only selects the best estimated hypothesis out of the plurality hypotheses calculated by the decoding unit 28. However, where a transmission channel is noisy and allows errors in transmission, there is no way to verify that the best estimated hypothesis is exactly the same sequence that was actually transmitted over the channel.

In the subject that application, it is proposed to perform a further maximum likelihood processing after the execution of the conventional LTE PUCCH receiver 20, based on a predetermined number of hypotheses out of all possible hypotheses. Indeed, conventional maximum likelihood processing takes a lot of time since the number of possible transmitted sequences grows exponentially with the input transmitted sequence length, as already explained above. Therefore, a brute force maximum likelihood processing quickly becomes impractical as the length of the input transmitted sequence increases. Hence, in the proposed solution, the further maximum likelihood processing is not performed on all the possible transmitted sequences. Instead, maximum likelihood processing is performed on a predetermined number of hypotheses, i.e. a predetermined number of possible transmitted sequences out of all the possible transmitted sequences.

In the decoding apparatus 30 of FIG. 4, all the operations performed by the CP removing unit 31, the FFT and resource demapping unit 32, the code-despreading unit 33, the channel estimation unit 34, the equalizing unit 35, the demodulation unit 36, the descrambling unit 37 and the decoding unit 38 are similar to those, already described above, and which are performed, respectively by the CP removing unit 21, FFT and resource demapping unit 22, the code-despreading unit 23, the channel estimation unit 24, the equalizing unit 25, the demodulation unit 26, the descrambling unit 77 and the decoding unit 28.

However, instead of selecting the best estimated hypothesis, the decoding unit 38 is instructed by the processing unit 40 to select a predetermined number of hypotheses. In the example of FIG. 4, it can readily be seen that more than one hypotheses (CQI=0100,0110,0111,0101) is outputted by the decoding unit 38 while in comparison, in the example of FIG. 3, only one hypothesis (CQI=0111) is outputted by the decoding unit 28. In the example of FIG. 4, the processing unit 40 instructs the decoding unit 38 to select two hypotheses (CQI=0110,0111). Or course, more than two hypotheses can be selected based on the teaching of the subject application. In an embodiment, the predetermined number of hypotheses is selected based on a quality indicator of the time-domain signal. For instance, the predetermined number of hypotheses is selected if the quality indicator is greater than a given threshold. For example, if the quality indicator is greater than a first value (e.g. 10 dB), then a first predetermined number of hypotheses is selected (e.g. 2 hypotheses). Further, if the quality indicator is greater than a second value (e.g. 5 dB), then a first predetermined number of hypotheses is selected (e.g. 6 hypotheses). In such case, it could be created a table of correspondence between the quality indicator value and the predetermined number of hypotheses to be selected. As an example, quality indicators such as the RSSI (Received Signal Strength), the SINR (Signal to Interference and §noise Ratio), a CQI (channel Quality Indicator) or a raw bit error rate obtained before channel decoding, may be contemplated.

However, others quality indicators may also be considered. In another embodiment, the predetermined number of hypotheses is selected based on a statistical value of the first likelihood metric associated with the best estimated hypothesis, as selected in the conventional PUCCH decoder 20 of FIG. 3. In an example, it is selected a plurality of hypotheses which have a first likelihood metric located within a given standard deviation from the first likelihood metric associated with the estimated best hypothesis. In an example, it is selected all the hypotheses which have a first likelihood metric located within a 5 dB standard from the first likelihood metric of the best estimated hypothesis. Of course, other statistical value may be contemplated as well. Further, a combination of the two forgoing embodiments can also be considered. Returning to FIG. 4, the processing unit 40 instructs the encoding unit 39 to encode each of the predetermined number of hypotheses, thereby creating a plurality of associated modulated sequence ($P_i$). For instance, for the LTE PUCCH signal in its format 2, the encoding unit 39 encodes each hypothesis (e.g. CQI information) into a 20 bits Reed-Muller encoded sequence and later scrambles and modulates the 20 bits Reed-Muller encoded sequence into the associated modulated sequence ($P_i$). Later, the processing unit 40 obtains the plurality of associated modulated sequences ($P_i$). In an example, the plurality of modulated sequences ($P_i$) associated with the predetermined number of hypotheses is stored in a memory of the processing unit 40, such as a ROM (Read-Only Memory) or a RAM (Random Access Memory). Further in FIG. 4, the processing unit 40 obtains the equalized data frequency-despreaded signal $(\widetilde{CE_1 \times D_i})$ generated by the equalizing unit 35 and calculates a second channel estimation value ($CE_2$) of the transmission channel for each of the plurality of associated modulated sequence ($P_i$). This is performed by multiplying a corresponding complex conjugate value of each of the plurality of associated modulated sequence ($P_i^*$) by the equalized data frequency-despreaded signal $(\widetilde{CE_1 \times D_i})$. One should note that the equalized data frequency-despreaded signal is obtained from a first run of the equalizing unit 35. Namely, the proposed solution does not need a further run of the equalizing unit 35 in order to operate. It is to be noted that if the time-domain signal comprises more than one data symbol, such operation is performed for each data symbol of each of the plurality of associated modulated sequence ($P_i$). One finding of the subject application is the fact that one or more of the plurality of associated modulated sequence ($P_i$) is very likely to be close to the complex conjugate of the equalized modulated sequence ($\widetilde{D}_i^*$) comprised in the equalized data frequency-despreaded signal $(\widetilde{CE_1 \times D_i})$. In such case, a good second channel estimate value ($CE_2$) could be contemplated if it is multiplied the complex conjugate value of an associated modulated sequence ($P_i^*$) by the equalized data frequency-despreaded signal $(\widetilde{CE_1 \times D_i})$. In fact, in that case, this would give the following relation $(\widetilde{CE_1 \times D_i}) \times P_i^* = CE_2$. However, in contrast, if the associated modulated sequence ($P_i$) is not close to the complex conjugate of the equalized modulated sequence ($\widetilde{D}_i^*$) comprised in the equalized data frequency-despreaded signal $(\widetilde{CE_1 \times D_i})$, therefore the second channel estimate ($CE_2$) would worsen as more noise would be added to the first channel estimate value ($CE_1$). In fact, in that case, this would give the following relation $(\widetilde{CE_1 \times D_i}) \times P_i^* = \widetilde{CE_1 \times D_i} \times P_i^*$. In a first embodiment where the time-domain signal comprises more than one data symbol, the second channel estimate value ($CE_2$) of each data symbol may be added altogether so as to form a single second channel estimate ($CE_2$). In a second embodiment where the time-domain signal comprises more than one data symbol, the second channel estimate value ($CE_2$) of each data symbol are not added together and each data symbol is associated with a respective second channel estimate value ($CE_2$). Further, in a third embodiment the first channel estimate value ($CE_1$) generated by the channel estimator 34 is added to the second channel estimation value ($CE_2$) of the first embodiment. Still Further, in a fourth embodiment the first channel estimate value ($CE_1$) generated by the channel estimator 24 of the conventional LTE PUCCH receiver 20 is added to each second channel estimation value ($CE_2$) of the second embodiment. In an example of the fourth embodiment, the sum between the first channel estimate value ($CE_1$) and the second channel estimation values ($CE_2$) of the second embodiment is a weighted sum. For instance, a given weight could be associated to the channel estimate values ($CE_1$, $CE_2$) based on a ratio of the number of pilot symbols to a number of data symbols comprised in the time-domain signal. For example, since the LTE PUCCH signal of FIG. 2 comprises two pilot symbols for five pilot symbols, a weight of $2/7$ could be applied to the first channel estimate value ($CE_1$) while a weight of $5/7$ could be applied to each second channel estimation value ($CE_2$) of the second embodiment. Of course, others ratios may be contemplated without departing from the teaching of the subject application. Returning back to FIG. 4, the processing unit 40 instructs the equalising unit 35 to equalize the product of the second channel estimation value ($CE_2$) with each of the associated modulated sequence ($P_i$), thereby generating a plurality of equalized data associated modulated sequence $(\widetilde{CE_2 \times P_i})$. Further, the processing unit 40 calculates a second likelihood metric associated with each of the predetermined number of hypotheses based on, at least, the second channel estimation value ($CE_2$). In an embodiment, the second likelihood metric is calculated based on the equalized data associated modulated sequence $(\widetilde{CE_2 \times P_i})$. In another embodiment, the second likelihood metric is calculated based on the respective equalized data associated modulated sequence $(\widetilde{CE_2 \times P_i})$ and the respective equalized data frequency-despreaded signal $(\widetilde{CE_1 \times D_i})$. For example, the second likelihood metric is a Euclidean distance between the respective equalized data associated modulated sequence $(\widetilde{CE_2 \times P_i})$ and the respective equalized data frequency-despreaded signal $(\widetilde{CE_1 \times D_i})$. Returning back in FIG. 4, the processing unit 40 selects the best estimated hypothesis out of the the predetermined number of hypotheses, based on the second likelihood metric. In the example of FIG. 4, the most likely transmitted sequence is 0110.

In view of the foregoing, it is now clear that the proposed maximum likelihood processing provides improvement over the conventional PUCCH receiver 20 of FIG. 3. Indeed, in the subject application it is provided a mechanism to improve the channel estimation by taking into account data information instead of relying solely on pilot information. This corresponds to a semi-blind maximum likelihood processing since both data and pilot information are used for the purpose of channel estimation. The proposed solution has the effect of improving decoding based on more accurate channel estimation, even where the pilot information density of a time-domain signal, is low as in the LTE PUCCH signal in its formats 2/2a/2b. Namely, the channel estimate is improved for the best estimated hypotheses while it worsens for the others hypotheses. The complexity of the proposed solution is also reduced since it is only considered a subset of the hypotheses calculated by a Reed-Muller decoder. Simulations have been performed with 13 bits input sequences of information for the LTE PUCCH channel in its format 2 wherein it has been experienced improvement from 2 dB to 4 dB in terms of BER (Bit Error Rate) and BLER (Block Error Rate), over conventional maximum likelihood decoders and about 1 dB over semi-blind maximum likelihood decoders such as those described in Document (1). Moreover, greater gains may be contemplated for other formats such as the formats 2a/2b wherein there is only one pilot symbol out of seven symbols. The above advantages may help reducing requirements on UE's battery since transmission could be performed at a lower power. Further, it could also help multiplexing more PUCCH users in the same band, hence freeing up some resource for data channels such as the PUSCH (Physical Uplink Shared Channel).

Figure 5:
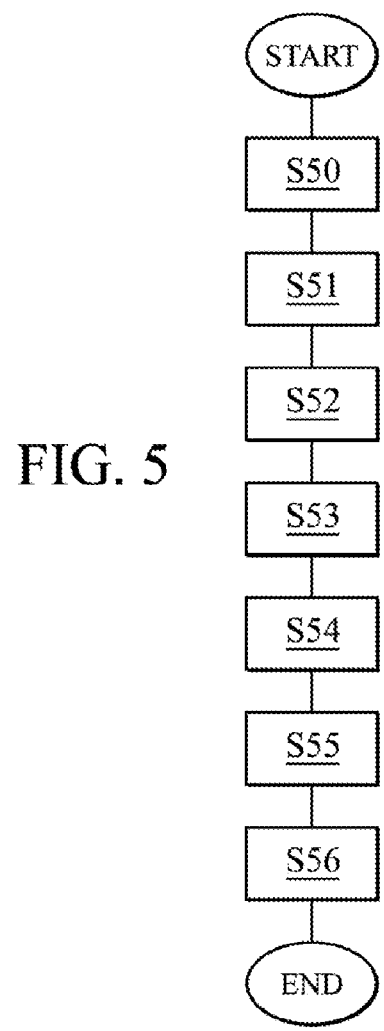
FIG. 5 is a schematic flow diagram of a method of decoding a signal transmitted over a communication channel of a wireless according to an embodiment of the subject application.

Referring to FIG. 5 there is diagrammatically shown therein a schematic diagram of a decoding apparatus according to embodiments of the subject application. In S50, it is performed a maximum likelihood decoding as already explained above, for instance with regards to the conventional LTE PUCCH decoder 20. Later, in S51, it is selected a predetermined number of hypotheses, as already explained above. In S52, it is encoded each hypothesis into a modulated sequences, as already explained above. Further, in S53, it is calculated a second channel estimate value for each modulated sequence associated with the predetermined number of hypotheses, as already explained above. In S54, it is equalized the product of the second channel estimate value by each of the modulated sequence associated with the predetermined number of hypotheses, as already explained above. Later, in S55, it is calculated a second likelihood metric, as already explained above. Finally, in S56, it is selected the best estimated hypothesis out of the predetermined number of hypotheses, based on the second likelihood metric, as already explained above.

The above description elaborates embodiments of the subject application with regard to a PUCCH channel of a LTE wireless network. However, those skilled in the art of communication systems will understand on the basis of the teachings of the present application that others channels of those wireless networks, embodying the same characteristics as the PUCCH in its formats 2/2a/2b, may be decoded according to the teachings of the subject application. For instance, the teaching of the subject application could be also applied to the PUSCH (Physical Uplink Share channel) CQI/PMI, which is based on a Reed-Muller encoding/decoding mechanism where the CQI/PMI information is less than eleven bits. Additionally, the proposed solution can be applied indifferently to different size of cyclic prefix, different number of antennas and number of symbols carried by the time-domain signal.

Of course, the above advantages are exemplary, and these or other advantages may be achieved by the proposed solution. Further, the skilled person will appreciate that not all advantages stated above are necessarily achieved by embodiments described herein.

A receiver, such as LTE eNodeB or UE receiver, comprising a decoding apparatus as claimed and one or more antennas is also claimed. Indeed, all the operations of the foregoing description had been made regarding a single antenna. However, the same teachings may be applied to more than one antenna in a similar way. Later on, the results of obtained on each antennas may be merged together using techniques such as MRC (Maximum Ratio Combining), for instance.

The proposed solution may also be implemented in a computer program product stored in a non-transitory computer-readable storage medium that stores computer-executable code which causes a processor computer to perform the operations of the processing unit 40 and/or the exemplary method as illustrated in the foregoing description, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims. For instance, the present invention can be applied not only to a base station device but also to a mobile station. Moreover, although the LTE radio communications system is described as an example in the foregoing exemplary embodiment, the present invention is not limited to LTE radio communications systems but also can be applied to other radio communications systems wherein maximum likelihood encoding/decoding is used. Reed-Muller encoding/decoding is just an example and others communications systems wherein sequences are encoded/decoded using maximum likelihood encoding/decoding process are also contemplated. Reed-Muller codes are a family of linear error-correcting codes used in communication systems. The special cases of Reed-Muller codes include Hadamard codes, Walsh-Hadamard codes, and Reed-Solomon codes. Reed-Muller codes are denoted by a RM (d, r) notation, where d is the order of the code and r determines the length of code $n=2^r$.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. For instance, the encoding unit 39 may be combined with the processing unit 40 into a single unit. Moreover, alternative embodiments may include multiple examples of a particular operation, and the order of operations may be altered in various other embodiments. Also for example, the examples, or portions thereof, may implemented as soft or code representations of physical circuitry or of logical representations convertible into physical circuitry, such as in a hardware description language of any appropriate type. Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A decoding apparatus for decoding a signal transmitted over a channel in a communication system, the signal comprising at least one data symbol and one pilot symbol, the data symbol comprising a first encoded sequence encoding a transmitted sequence, the pilot symbol comprising a pilot signal, the decoding apparatus comprising:

a channel estimation unit arranged to calculate a first channel estimation value of the channel based on the pilot symbol;

an equalizing unit operably coupled to the channel estimation unit and arranged to generate a first equalized data symbol based on the data symbol and the first channel estimation value;

a Maximum Likelihood decoder operably coupled to the equalizing unit and arranged to:

obtain the first encoded sequence by multiplying the first equalized data symbol by a complex conjugate value of the first channel estimation value;

calculate a plurality of possible transmitted sequences based on the first encoded sequence;

calculate a first likelihood metric associated with each of the plurality of possible transmitted sequences based on, at least, the first channel estimation value; and, select the most likely transmitted sequence out of the plurality of possible transmitted sequences, based on the first likelihood metric;

wherein, the decoding apparatus further comprises:

a Maximum Likelihood encoder arrange to encode sequences into encoded sequences; and, a processing unit, operably coupled to the equalizing unit, the Maximum Likelihood decoder and the Maximum Likelihood encoder, the processing unit being arranged to:

select a predetermined number of possible transmitted sequences out of the plurality of possible transmitted sequences;

cause the Maximum Likelihood encoder to encode each of the predetermined number of possible transmitted sequences into a respective second encoded sequence;

calculate a second channel estimation value of the channel, for each second encoded sequence, by multiplying a complex conjugate value of the respective second encoded sequence by the first equalized data symbol;

cause the equalizing unit to generate a second equalized data symbol for each second encoded sequence based on the respective second encoded sequence and, at least, the second channel estimation value;

calculate a second likelihood metric for each third encoded sequence based on, at least, the second channel estimation value;

cause the Maximum Likelihood decoder to select the most likely transmitted sequence out of the predetermined number of possible transmitted sequences based on the second likelihood metric.

2. The decoding apparatus of claim 1, wherein the predetermined number of possible transmitted sequences is selected based on one or more of:
   a quality indicator of the signal,
   a statistical value of the first likelihood metric; and,
   a fixed number.
3. The decoding apparatus of claim 2, wherein the statistical value is a standard deviation value of the first likelihood metric calculated over a given number of the plurality of possible transmitted sequences.
4. The decoding apparatus of claim 1, wherein the processing unit is further operably coupled to the channel estimation unit, the processing unit being further arranged to:
   cause the equalizing unit to generate a second equalized data symbol for each second encoded sequence based on the respective second encoded sequence and a sum of the first channel estimation value and the second channel estimation value.
5. The decoding apparatus of claim 4, wherein the sum of the first channel estimation value and the second channel estimation value is a weighted sum.
6. The decoding apparatus of claim 4, wherein the second likelihood metric is a Euclidean distance between the first equalized data symbol and the second equalized data symbol.
7. The decoding apparatus of claim 1, wherein,
   the communication system is a Long Term Evolution (LTE) communication system; and,
   the signal is one of a Physical Uplink Control Channel (PUCCH) signal or a LTE Physical Uplink Shared Channel (PUSCH) signal.
8. A receiver comprising:
   one or more antennas; and,
   the decoding apparatus of claim 1 operably coupled the one or more antennas.
9. A LTE receiver comprising:
   one or more antennas;
   the decoding apparatus of claim 7 operably coupled the one or more antennas;
   a cyclic prefix (CP) removing unit arranged to remove a CP from a LTE signal;
   a Fast-Fourier Transform (FFT) and resource demapping unit operably coupled to the CP removing unit and arranged to generate a data frequency-domain signal;
   a code-despreading unit operably coupled to the FFT and resource demapping unit and the equalizing unit and arranged to despread a data frequency-domain signal;
   a demodulation unit operably coupled to the equalizing unit and arranged to demodulate an equalized data symbol; and,
   a descrambling unit operably coupled to the demodulation unit and to the Maximum Likelihood encoder and arranged to descramble scrambled sequences into encoded sequence.
10. A method of decoding a signal transmitted over a channel in a communication system, the signal comprising at least one data symbol and one pilot symbol, the data symbol comprising a first encoded sequence encoding a transmitted sequence, the pilot symbol comprising a pilot signal, the method comprising:
    calculating a first channel estimation value of the channel based on the pilot symbol;
    generating a first equalized data symbol based on the data symbol and the first channel estimation value;
    obtaining the first encoded sequence by multiplying the first equalized data symbol by a complex conjugate value of the first channel estimation value;
    calculating a plurality of possible transmitted sequences based on the first encoded sequence,
    calculating a first likelihood metric associated with each of the plurality of possible transmitted sequences based on, at least, the first channel estimation value; and,
    selecting the most likely transmitted sequence out of the plurality of possible transmitted sequences, based on the first likelihood metric;
    wherein, the method further comprises:
    selecting a predetermined number of possible transmitted sequences out of the plurality of possible transmitted sequences;
    encoding each of the predetermined number of possible transmitted sequences into a respective second encoded sequence;
    calculating a second channel estimation value of the channel, for each second encoded sequence, by multiplying a complex conjugate value of the respective second encoded sequence by the first equalized data symbol;
    generating a second equalized data symbol for each second encoded sequence based on the respective second encoded sequence and, at least, the second channel estimation value;
    calculating a second likelihood metric for each third encoded sequence based on, at least, the second channel estimation value;
    selecting the most likely transmitted sequence out of the predetermined number of possible transmitted sequences based on the second likelihood metric.
11. The method of claim 10, wherein the predetermined number of possible transmitted sequences is selected based on one or more of:
    a quality indicator of the signal,
    a statistical value of the first likelihood metric; and,
    a fixed number.
12. The method of claim 11, wherein the statistical value is a standard deviation value of the first likelihood metric calculated over a given number of the plurality of possible transmitted sequences.
13. The method of claim 10, further comprising:
    generating a second equalized data symbol for each second encoded sequence based on the respective second encoded sequence and a sum of the first channel estimation value and the second channel estimation value.
14. The method of claim 13, wherein the sum of the first channel estimation value and the second channel estimation value is a weighted sum.
15. The method of claim 13, wherein the second likelihood metric is a Euclidean distance between the first equalized data symbol and the second equalized data symbol.
16. The method of claim 10, wherein,
    the communication system is a Long Term Evolution (LTE) communication system; and,
    the signal is one of a LTE Physical Uplink Control Channel (PUCCH) signal or a LTE Physical Uplink Shared Channel (PUSCH) signal.
17. A computer program product stored in a non-transitory computer-readable storage medium that stores computer-executable code for decoding a signal transmitted over a channel in a communication system, the signal comprising at least one data symbol and one pilot symbol, the data symbol comprising a first encoded sequence encoding a transmitted sequence, the pilot symbol comprising a pilot signal, to perform the method according to claim 10.

* * * * *